(12) United States Patent
Rogers

(10) Patent No.: US 6,366,399 B1
(45) Date of Patent: *Apr. 2, 2002

(54) OPTICAL IMAGING SYSTEM

(75) Inventor: Philip Rogers, Bodelwyddan (GB)

(73) Assignee: Pilkington P.E. Limited, Denbighshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/304,497

(22) Filed: May 3, 1999

(30) Foreign Application Priority Data

May 15, 1998 (GB) .............................................. 9810341

(51) Int. Cl.⁷ .............................................. G03B 13/06
(52) U.S. Cl. ....................... 359/432; 359/366; 359/353; 359/365
(58) Field of Search .......................... 359/432, 350–359, 359/362, 364–366, 431–433, 726–733, 856–861; 343/725; 356/74

(56) References Cited

U.S. PATENT DOCUMENTS

| | | | | |
|---|---|---|---|---|
| 3,650,629 A | * | 3/1972 | Erickson ...................... | 356/74 |
| 4,260,993 A | | 4/1981 | Aubry et al. ............... | 343/229 |
| 4,432,596 A | | 2/1984 | Campbell et al. ........... | 359/365 |
| 4,866,454 A | * | 9/1989 | Droessler et al. ........... | 343/725 |
| 5,114,238 A | | 5/1992 | Sigler .......................... | 359/399 |
| 5,144,476 A | | 9/1992 | Kebo .......................... | 359/366 |
| 5,181,145 A | | 1/1993 | Eden ........................... | 359/859 |
| 6,118,583 A | * | 9/2000 | Rogers ....................... | 359/432 |

FOREIGN PATENT DOCUMENTS

| | | |
|---|---|---|
| EP | 0 433 613 A1 | 6/1991 |
| EP | 0 490 497 A2 | 6/1992 |
| FR | 2 764 080 A1 | 6/1998 |
| GB | 1336801 A | 11/1973 |
| WO | WO 98/00743 A1 | 1/1998 |

\* cited by examiner

Primary Examiner—Thong Nguyen
(74) Attorney, Agent, or Firm—Alston & Bird LLP

(57) ABSTRACT

A two-stage multi-spectral imaging system comprising a reflective objective and a reflective relay aligned on a common optical axis, the objective being arranged to form an intermediate image and the relay being arranged to deliver image-forming radiation emanating from the intermediate image to a focal plane, wherein the objective is formed by a large concave primary mirror which is apertured on-axis and a small secondary mirror generally disposed in the form of a "Cassegrain" objective, the relay is formed by a pair of confronting mirrors each being apertured on-axis to enable passage of radiation into and out of the relay, and the relay being positioned to provide space between the relay and the focal plane to accommodate waveband selective splitting optics if so desired.

7 Claims, 1 Drawing Sheet

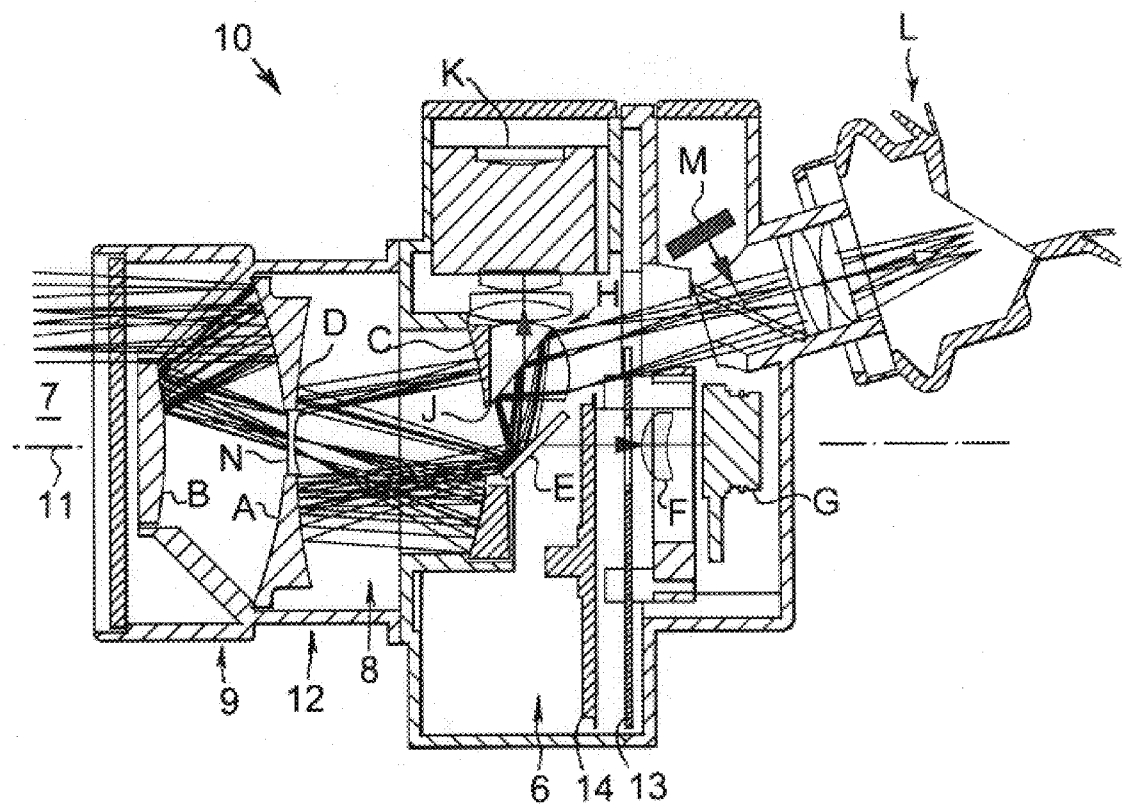

OPTICAL IMAGING SYSTEM

FIELD OF THE INVENTION

This invention relates to optical systems and in particular to optical imaging systems which are capable of multi-spectral imagery.

SUMMARY OF THE INVENTION

According to the present invention there is provided a two-stage multi-spectral imaging system comprising a reflective objective and a reflective relay aligned on a common optical axis, the objective being arranged to form an intermediate image and the relay being arranged to deliver image-forming radiation emanating from the intermediate image to a focal plane, wherein the objective is formed by a large concave primary mirror which is apertured on-axis and a small secondary mirror generally disposed in the form of a "Cassegrain" objective, the relay is formed by a pair of confronting mirrors each being apertured on-axis to enable passage of radiation into and out of the relay, and the relay being positioned to provide space between the relay and the focal plane to accommodate waveband selective splitting optics if so desired.

Preferably a field stop is located at the apertured centre of the primary objective mirror.

Preferably a field lens which is transmissive over all desired spectral wavebands is located adjacent the intermediate image at the apertured centre of the primary objective mirror to provide pupil imaging.

Preferably waveband-selective splitting optics are provided at a pupil in said space, said optics comprising at least a dichroic mirror arranged to transmit longer wavelengths and to reflect shorter wavelengths. Said optics may further comprise a beam splitter which may be neutral or dichroic to handle the reflected shorter wavelengths.

Conveniently the dichroic mirror transmits mid and/or far infrared wavebands.

Within what is included herein as being "Cassegrain" the secondary mirror of the objective may be generally planar or it may be convex. Furthermore "mirrors" which are said to be apertured may be provided either by a substrate with a hole or opening or by a substrate which is transmissive to radiation in the relevant wavebands at the location of the aperture.

The relay mirrors are preferably concave. The various mirrors of the system together with the housing for the system are preferably made of the same material such as aluminium so that the system is inherently athermal. Also where the housing is sealed and radiation ingress is via a window it may be necessary to compensate the system for chromatic and thermal effects if the window is optically powered (as would be the case if the window were dome shaped) in which case it is preferred to make one of the mirrors a Mangin mirror, for example a relay mirror.

DETAILED DESCRIPTION OF PREFERRED EMBODIMENTS

An embodiment of the present invention will now be described by way of example with reference to the accompanying schematic drawing.

As is shown in the drawing a two stage axially-aligned multi-spectral imaging system 10 comprises a reflective objective 9 having mirrors A, B arranged as a "Cassegrain" objective. The primary mirror A is apertured on the optical axis 11 of the system and is concave whereas the secondary mirror B is convex which enables the resultant intermediate image at 12 to be nominally flat. The second stage of the system 10 is formed by a reflective relay 8 having confronting mirrors C, D each of which is apertured on-axis to enable passage of light radiation into and out of the relay 8. Mirror C which provides the third reflective surface of the system 10 for radiation received from object space 7 is axially to the rear of the objective 9 and space is provided between mirror C and the focal plane of the system 10 to accommodate waveband-selective splitting optics 6 which conveniently are located at a pupil so that optics 6 are compact.

Optics 6 are formed by a dichroic mirror E which transmits longer wavelengths (such as mid and/or far infrared) which are then transmitted by a subsidiary lens F on to a suitable detector G. Component G typically operates without cooling (and lens F is provided to increase the numerical aperture) but could be replaced by a cooled detector having a cold shield. Short wave radiation reflected by mirror E is delivered to a prism arrangement H which incorporates a beam splitter J so that the radiation is both transmitted and reflected. The beam-splitter J may be dichroic. The transmitted radiation from component J is delivered to an image intensifier charge coupled device K whilst the reflected radiation from component J is delivered to a direct view eyepiece L which is provided with an injected image by an electrical injection device M. The injected image may be a bore sight marking or the intensified image output by device K.

In the case where detector G is uncooled and detects radiation in the 8–13 micron waveband an oscillatory chopper blade 13 prior to lens F is provided to prevent the detector G becoming saturated due to continuous build up of heat. Furthermore a rotating disc 14 is provided to achieve a microscan which effectively achieves a reduction of pixel size at the detector. Disc 14 is provided with a sequence of transmissive windows with different wedge angles around its periphery.

A field lens N which is transmissive over all desired spectral wavebands (in this case, mid, far and near infrared) is located adjacent the intermediate image 12 at the apertured centre of the primary objective mirror A to provide pupil imaging since this is required by the imaging optics 6. Additionally in this embodiment the lens N interfaces with the mirror A to provide a field stop.

Mirrors A and D as illustrated are carried back-to-back by a single physical component which also supports the lens N. However, while still forming a single component mirror D may be located between mirrors A and B due to the fact that in the radial direction mirrors A and D do not overlap to any significant extent.

What is claimed is:

1. A two-stage multi-spectral imaging system comprising a reflective objective and a reflective relay aligned on a common optical axis, the objective being arranged to form an intermediate image and the relay being arranged to deliver image-forming radiation emanating from the intermediate image to a focal plane, wherein the objective is formed by a large concave primary mirror which is apertured on-axis and a small secondary mirror in the form of a "Cassegrain" objective, the relay is formed by a pair of confronting mirrors each being apertured on-axis to enable passage of radiation into and out of the relay, and the relay being positioned to provide space between the relay and the focal plane to accommodate waveband selective splitting optics.

2. An imaginary system as claimed in claim 1, wherein a field stop is located at the apertured centre of the primary objective mirror.

3. An imaging system as claimed in claim 1, wherein a field lens which is transmissive over all desired spectral wavebands is located adjacent the intermediate image at the apertured centre of the primary objective mirror to provide pupil imaging.

4. An imaging system as claimed in claim 1, wherein waveband-selective splitting optics are provided at a pupil in said space, said optics comprising at least a dichroic mirror arranged to transmit longer wavelengths and to reflect shorter wavelengths.

5. An imaging system as claimed in claim 4, wherein the dichroic mirror transmits mid and/or far infrared wavebands.

6. An imaging system as claimed in claim 1, wherein the various mirrors together with the housing for the system are made of the same material so that the system is inherently athermal.

7. An imaging system as claimed in claim 6, wherein the housing is sealed and radiation ingress is via an optically-powered window, the system being compensated for chromatic and thermal effects by forming one of the mirrors of the system as a mangin mirror.

* * * * *